US012411901B2

(12) United States Patent
Ponugoti et al.

(10) Patent No.: US 12,411,901 B2
(45) Date of Patent: Sep. 9, 2025

(54) SYSTEMS AND METHODS FOR TRANSMITTING ELECTRONIC QUERY DATA

(71) Applicant: Capital One Services, LLC, McLean, VA (US)

(72) Inventors: Poojitha Ponugoti, Allen, TX (US); Bharath Chekuri, Aubrey, TX (US); Hanquan Liang, Dallas, TX (US); Jesus Gomez, Phoenix, AZ (US); Julia Kang, Plano, TX (US); Nhi Dang, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 92 days.

(21) Appl. No.: 18/454,898

(22) Filed: Aug. 24, 2023

(65) Prior Publication Data
US 2025/0068687 A1   Feb. 27, 2025

(51) Int. Cl.
*G06F 16/9538*   (2019.01)
*G06F 16/9532*   (2019.01)
*G06F 16/9537*   (2019.01)

(52) U.S. Cl.
CPC ...... *G06F 16/9538* (2019.01); *G06F 16/9532* (2019.01); *G06F 16/9537* (2019.01)

(58) Field of Classification Search
CPC .. G06F 16/168; G06F 16/164; G06F 21/6209; G06F 16/904; G06F 16/909; G06F 16/29; G06F 16/212; G06F 16/9537; G06F 21/84; G06F 21/6254; G06F 21/6218;
(Continued)

(56) References Cited

U.S. PATENT DOCUMENTS 9,600,822 B2      3/2017   Pyle et al.
10,102,555 B2   10/2018   Park et al.
12,190,371 B1 *   1/2025   Thornicroft ............ G06Q 30/08
(Continued)

OTHER PUBLICATIONS

Liu et al. "Fill in the Blank: Context-aware Automated Text Input Generation for Mobile GUI Testing" 2023 IEEE/ACM 45th International Conference on Software Engineering (ICSE) (Year: 2023).*
(Continued)

*Primary Examiner* — Ajay M Bhatia
*Assistant Examiner* — Berhanu Mitiku
(74) *Attorney, Agent, or Firm* — Bookoff McAndrews, PLLC

(57) ABSTRACT

A computer-implemented method for transmitting electronic query data related to various types of information or resources may include detecting user input on a website or other platform indicating permission to receive electronic data, causing display a widget or other user interface element that pre-fills the user input with query criteria, and requesting additional query criteria from the user to generate a complete query. The method may also include receiving available data including corresponding location or other relevant data for each available resource, determining a subset of data including recommended resources for the user based on the query location or other parameters, the initial query criteria, and the additional query criteria, and transmitting the subset of data to a graphical user interface on the user's device or other platform.

20 Claims, 4 Drawing Sheets

(58) Field of Classification Search
CPC .............. G06F 16/9538; G06F 16/951; G06F 16/9535; G06F 16/9532; G06F 16/953
See application file for complete search history.

(56) References Cited

U.S. PATENT DOCUMENTS

| | | |
|---|---|---|
| 2008/0195435 A1 | 8/2008 | Bentley et al. |
| 2015/0120489 A1* | 4/2015 | Edelman ............ G06Q 30/0611 |
| 2016/0364783 A1* | 12/2016 | Ramanuja .......... G06Q 30/0625 |
| 2018/0090004 A1* | 3/2018 | Kuraoka ................ G08G 1/161 |
| 2023/0029876 A1* | 2/2023 | Lenke et al. ......... G06Q 10/109 |
| 2023/0137068 A1* | 5/2023 | Li ......................... G06F 16/957 |
| | | 707/741 |
| 2023/0384121 A1* | 11/2023 | Esna Ashari Esfahani ................ |
| | | G01C 21/3679 |

OTHER PUBLICATIONS

Zündorf "Electric Vehicle Routing with Realistic Recharging Models" KIT—University of the State of Baden-Wuerttemberg and National Laboratory of the Helmholtz Association Master Thesis at the Department of Informatics Institute of Theoretical Computer Science (Year: 2014).*

Rathod et.al. "Product Rank Based Search Engine for E-Commerce" 2018 3rd International Conference for Convergence in Technology (I2CT) The Gateway Hotel, XION Complex, Wakad Road, Pune, India. Apr. 6-8, 2018 (Year: 2018).*

Wachter et al. "Predicting Automotive Sales using Pre-Purchase Online Search Data" Proceedings of the Federated Conference on Computer Science and Information Systems IEEE 2019 (Year: 2019).*

* cited by examiner

SYSTEMS AND METHODS FOR TRANSMITTING ELECTRONIC QUERY DATA

TECHNICAL FIELD

Various embodiments of this disclosure relate generally to techniques for transmitting electronic query data, and, more particularly, to systems and methods for searching and comparing data from multiple sources based on specific criteria.

BACKGROUND

The current process for searching for vehicles online can be time-consuming and inconvenient for customers. In order to search for a vehicle in a particular area, customers must visit each dealership's website and apply search criteria to find vehicles that meet their needs. This process can be particularly tedious for customers who are interested in comparing vehicles from multiple dealerships, as it requires them to navigate from website to website, repeating the search process for each dealership individually. Even when using vehicle aggregator websites, customers may still have to visit multiple websites and compare vehicles from each dealer individually to find the best match.

This process is not only time-consuming, but it can also be frustrating for customers who are unable to find a vehicle that meets their specific requirements. Additionally, it can be difficult for customers to get a complete picture of the available inventory in their area, as they are limited to searching one dealership or aggregator website at a time.

Conventional techniques, including the foregoing, fail to address the issue of efficiently searching and comparing vehicles from multiple dealerships in a single location. This leaves customers with a need for a more convenient and efficient way to search for and compare vehicles from multiple dealerships in a specific area.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining and transmitting electronic query data. The methods and systems may include searching and comparing data from multiple sources based on specific criteria.

In some aspects, the techniques described herein relate to a computer-implemented method for transmitting electronic query data, the method including: detecting vehicle data on a first website; causing a widget to automatically determine one or more vehicle query criteria based on at least a part of the detected vehicle data; causing, via the widget, a graphical user interface (GUI) associated with the widget to display a prompt for a user to provide additional vehicle query criteria, receiving, via the GUI, the additional vehicle query criteria from the user, the additional vehicle query criteria including a geographic query location for the user; determining, with reference to a database of available vehicle data, a first subset of data including recommended vehicles for the user based on the geographic query location of the user, the vehicle query criteria, and the additional vehicle query criteria; transmitting the first subset of data to a graphical user interface (GUI) associated with the widget; and causing the widget to display at least a portion of the first subset of data on the GUI, the GUI being an overlay to an existing website.

In some aspects, the techniques described herein relate to a computer-implemented method for transmitting electronic query data, the method including: detecting, on a user device of a user, user input on a first website indicative of permission to receive electronic data; causing, via a widget, a graphical user interface (GUI) associated with the widget to display a prompt for a user to provide additional vehicle query criteria, receiving, via the GUI, the additional vehicle query criteria from the user, the additional vehicle query criteria including a geographic query location for the user; receiving available vehicle data including corresponding location data for each available vehicle included in the available vehicle data; determining a first subset of data including recommended vehicles for the user based on the geographic query location of the user, the vehicle query criteria, and the additional vehicle query criteria; and modifying the GUI of the user device to display the first subset of data including recommended vehicles on a map at corresponding locations.

In some aspects, the techniques described herein relate to a computer-implemented method for providing contextually relevant recommendations, the method including: detecting vehicle data present on a first website; causing a widget to automatically determine one or more first vehicle query criteria based on the detected vehicle data; receiving, via a graphical user interface (GUI) associated with the widget, additional vehicle query criteria from the user; combining the first vehicle query criteria with the additional vehicle query criteria to generate a combined vehicle query criteria; determining, with reference to a database of available vehicle data, a subset of recommended vehicles based on the combined vehicle query criteria; displaying the subset of recommended vehicles, wherein display of the subset of recommended vehicles includes a representation of the subset of recommended vehicles as corresponding locations on a map.

In another aspect, an exemplary embodiment of a method for training a machine-learning model for transmitting electronic query data may include: developing a training data set based on one or more vehicle search results, vehicle context, html from search results pages, contextual information relating to vehicles, and the like; optimizing, when desired, said model; establishing an instance of said model within a widget on a device of a user; utilizing said model to predict future behavior, predict product information based on contextual indicators, predict user preferences, generate user recommendations, or adjust one or more parameter of a widget and/or search results based on information provided to the model; adjusting an output of the widget based on the output of the machine-learning model.

It is to be understood that both the foregoing general description and the following detailed description are exemplary and explanatory only and are not restrictive of the disclosed embodiments, as claimed. Both the foregoing general description and the following detailed description demonstrate that the present system and method advantageously provide for a more efficient search, collection, and comparison process for transmitting electronic query data, resolving at least the above-reference challenges.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
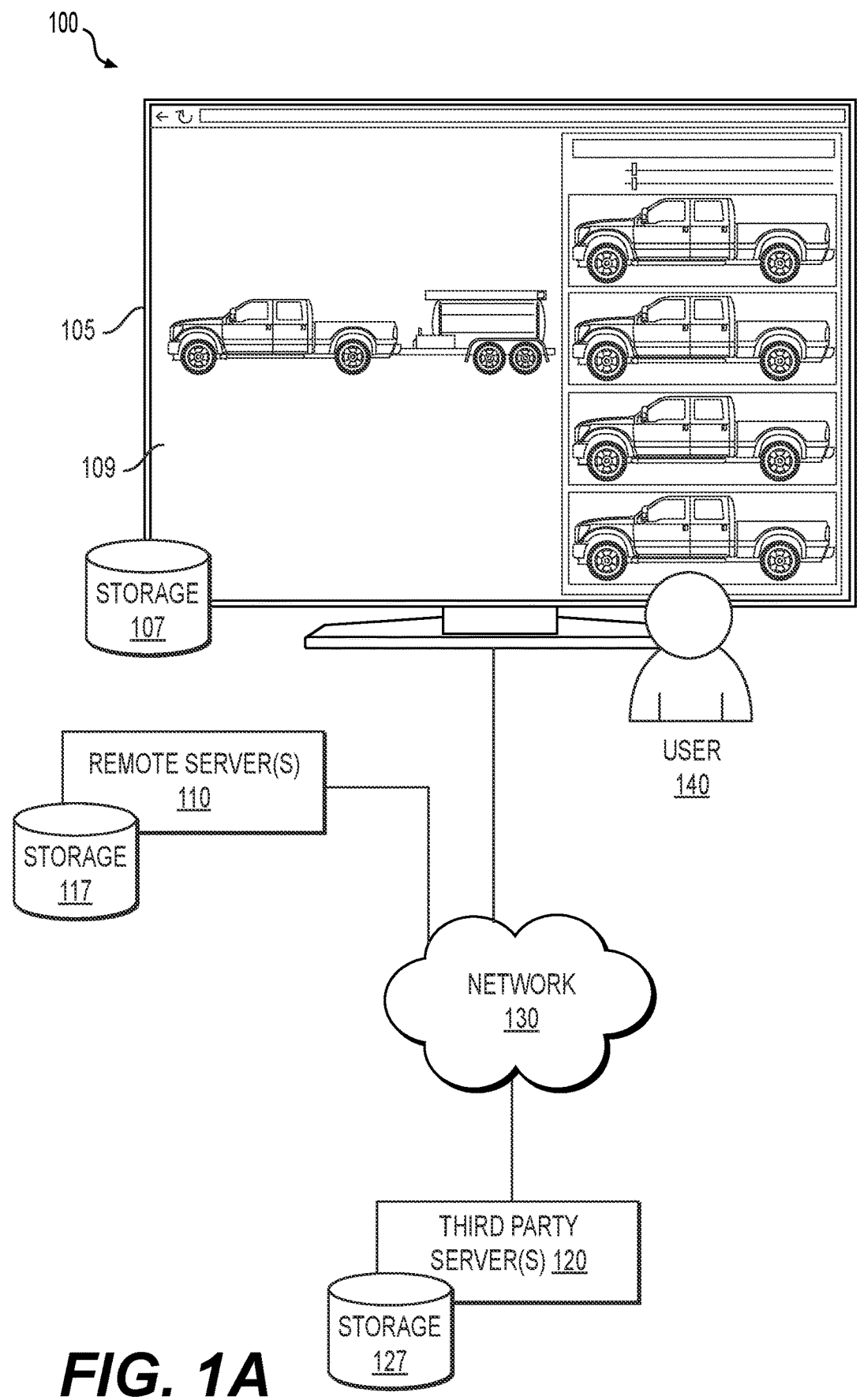
FIG. 1A depicts an exemplary environment for transmitting electronic query data, according to one or more embodiments.

According to certain aspects of the disclosure, methods and systems are disclosed for improving the efficiency for transmitting electronic query data, e.g., by aggregating and comparing inventory from multiple dealerships in a specific area. Currently, customers must visit multiple dealership websites or use vehicle aggregator websites to search for and compare vehicles, which can be time-consuming and inconvenient. However, conventional techniques may not allow for the aggregation and comparison of inventory from multiple dealerships in a single location. Accordingly, improvements in technology relating to vehicle search efficiency are needed.

As will be discussed in more detail below, according to various embodiments of the present disclosure, systems and methods are described for using machine-learning to transmit electronic query data. By training a machine-learning model, e.g., via supervised or semi-supervised learning, to learn associations between search data and purchase behavior data, the trained machine-learning model may be usable to improve transmitting electronic query data.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a widget (e.g., a browser extension, plug in, or the like) may be instanced on a machine of user, the widget configured to assist in search query transmission and optimization. The widget utilizes customer search criteria along with customer location information and retrieves and displays a list of vehicles from all nearby dealerships based on similar criteria. The widget additionally provides a map which displays results. When a search is undertaken, the widget saves the search conditions locally and will re-apply the search conditions when contextually appropriate, such as when the user navigates to another webpage. The widget further includes contextual understanding of the content of a user's screen, such as when a user is browsing the webpage of a certain vehicle brand. The widget then displays vehicles similar to the vehicle brand based on webpage context.

In another exemplary use case, a machine-learning model may be trained to identify contextual indicators which may be related to vehicle search criteria. The machine-leaning model may be trained on a dataset that includes vehicle webpages and dealer webpages so that the machine-learning model may then predict search criteria based on a given webpage. In some embodiments, the machine-learning model could be further trained on a dataset comprising example search data from potential vehicle purchasers. This data may include search parameters such as make, model, year, color, mileage, and price range, as well as more subjective variables like aesthetic appeal, vehicle performance, and brand reputation. By cross-analyzing these diverse types of data, the model can establish multidimensional associations and infer potential relationships between various search criteria and contextual indicators. For instance, the model may learn to find associations between specific contextual indicators and certain vehicle makes or models.

While several of the examples above involve vehicle searches, it should be understood that techniques according to this disclosure may be adapted to any suitable type query. It should also be understood that the examples above are illustrative only. The techniques and technologies of this disclosure may be adapted to any suitable activity. For example, the present techniques according to this disclosure may be adapted for use with a wide variety of items sold by a wide variety of different merchants.

Presented below are various aspects of machine-learning techniques that may be adapted to transmitting electronic query data. As will be discussed in more detail below, machine-learning techniques adapted to derive contextual indicators from one or more data sets, may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

Figure 1B:
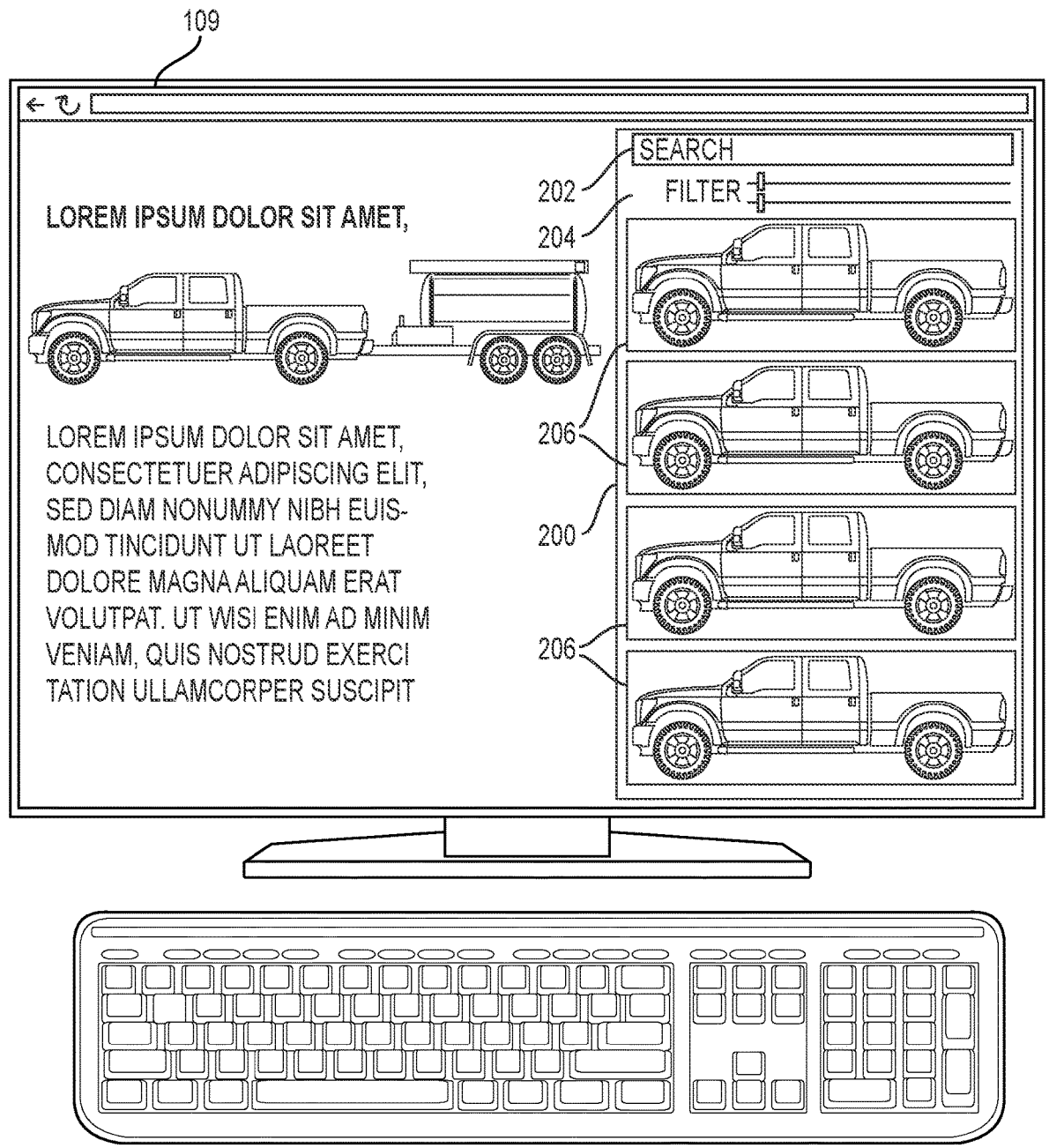
FIG. 1B depicts an exemplary display with a user interface and a widget, according to one or more embodiments.

FIG. 1A depicts an exemplary environment 100 that may be utilized with techniques presented herein, and FIG. 1B depicts an exemplary display 109 with a widget 200. One or more user device(s) 105, one or more remote server(s) 110, and/or one or more third-party server(s) 120 may communicate across an electronic network 130. One or more of the one or more user device(s) 105 may be associated with a user 140.

Hereafter, this description will refer to the one or more user devices 105 as "the user device 105," the one or more remote servers 110 as "the remote server 110," and the one or more third-party servers as "the third-party server", respectively, so as to simplify the description of the concepts described herein. The user device 105 may be configured to enable the user 140 to access and/or interact with other systems in the environment 100 via, for example, an input/output device such as a display 109 or other input/output controls (e.g., keyboards, mice, webcams, and the like.). For example, the user device 105 may be a computer system such as, for example, a desktop computer, a laptop computer, a tablet, a smart cellular phone, a smart watch or other electronic wearable, etc. In some embodiments, the user device 105 may include one or more electronic application(s), e.g., a program, plugin, browser extension, etc., installed on a memory of the user device 105. In some embodiments, the electronic application(s) may be associated with one or more of the other components in the environment 100. For example, the electronic application(s) may include one or more of widget and/or browser control software, contextual indicator monitoring software, widget development tools, etc. In some examples, the electronic application(s) include a browser extension application that adds functionality to a web browser launched on the user device 105. In other examples, the application may be a thick client application that is installed locally on the user device 105 (e.g., a desktop application or mobile application). In further examples, the application may be a thin client application (e.g., a web application) that is rendered via the web browser launched on the user device 105. Additionally, the user device 105 may be equipped with one or more components that are responsible for generating graphic user interfaces (GUIs) based on the information stored in its memory and any additional information received from other systems within the environment 100. These GUIs, which can be either mobile application interfaces or browser user interfaces, are displayed on the device's display 109 for the user to interact with. The display 109 may feature a touch screen for ease of use, or alternative input systems such as a mouse, keyboard, or the like, to provide the user with a range of options for controlling the functions of the user device 105.

The GUIs are designed to provide an intuitive and user-friendly experience. They may include text elements, input text boxes, and selection controls, among others, that allow the user to interact with the device 105 and access its various functions. The GUIs may be dynamic and may be updated in real-time based on the information received from the other systems in the environment 100, providing the user with the most up-to-date information at all times.

The third-party server 120 may be connected to (e.g., include, contain, or otherwise have access to) data storage system 127. Data storage system 127 may include one or more databases that store information about various vehicles, such as vehicle listings and details. The user device 105 may interact with the third-party server 120 through the graphic user interfaces (GUIs) rendered by the user device 105. The GUIs may allow the user to retrieve information from the third-party server 120, including details about the vehicles stored in the databases of the data storage systems 127.

The remote server 110 may include (e.g., contain or otherwise have access to) one or more storage systems 117, and may be associated with an entity. By way of example, the entity may be a financial services provider which provides financial services (e.g., accounts) to customers. In some embodiments, the remote server 110 may be associated with a third-party unaffiliated with the widget 200, while in some examples the remote server 110 may be a party associated with the widget 200, such as a party which published, or otherwise made available, the widget 200. In other examples, there may be multiple remote server 110 systems, where some are associated with the widget 200 and some are not. As described elsewhere herein, the financial account services may include issuing financial accounts to users, such as checking/debit card accounts and credit card accounts, and monitoring activities associated with the financial accounts, including interactions (e.g., transactions or purchases between the users and merchants using the accounts), fund transfers, payments, and the like, among other services. Data collected from the monitoring, including interaction data, may be stored over time. The financial account provider may provide certain types of financial account information, such as the interaction data, to one or more components of the environment 100. Such users may opt in or otherwise provide their consent, permission, or the like to enable such sharing.

One or more data storage systems 107, 117, 127 may be associated with each of the one or more user device(s) 105, one or more remote server(s) 110, and third-party server(s) 120, respectively. Each of the one or more data storage systems 107, 117, 127 may include a server system, an electronic data system, or computer-readable memory such as a hard drive, flash drive, disk, etc. In some embodiments, the one or more data storage systems 107, 117, 127 each include and/or interact with an application programming interface for exchanging data to other systems, e.g., one or more of the other components of the environment 100. The one or more data storage systems 107, 117, 127 may each include and/or act as a repository or source for vehicle and/or query search data. For example, one or more vehicle parameters, as discussed in more detail below, may be stored in data storage system 127 associated with the third-party server 120. Third-party server 120 may serve to collect, store, aggregate, modify, delete, or otherwise manipulate vehicle parameters in the data storage system 127 associated with one or more vehicles. It will be appreciated that vehicle parameters may be stored on one or more data storage systems 107 associated with the user device 105 and/or on one or more data storage systems 117 associated with one or more remote server 110. Remote server 110 may periodically interact with the third-party server 120. In doing so, remote server 110 may ingest and/or update vehicle parameters and store the updated vehicle parameters in a database on data storage system 117. Similarly, user device 105 may periodically interact with remote server 110 and/or the third-party server 120 to ingest and/or update vehicle parameters and store the updated vehicle parameters in data storage system 107.

In various embodiments, the electronic network 130 may be a wide area network ("WAN"), a local area network ("LAN"), personal area network ("PAN"), or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, one or more of the one or more data storage systems 107, 117, 127, user device 105 (or an application running thereon), and/or remote server 110, and/or one or more third party server 120 (together, the system, according to some embodiments) may one or more of (i) generate, store, train, or use a machine-learning model configured to correlate and/or associate historical vehicle purchases and historical query criteria with one another and/or user behavior paths to purchase. The system may include a machine-learning model and/or instructions associated with the machine-learning model, e.g., instructions for generating a machine-learning model, training the machine-learning model, using the machine-learning model etc. The system may include instructions for retrieving system data, adjusting system data, e.g., based on the output of the machine-learning model, and/or operating the display 109 to output system data, e.g., as adjusted based on the machine-learning model. The system may include training data, e.g., contextual data, and may include ground truth, e.g., recommendation data. The recommendation data may include historical user searches as they relate to instances or appearances of contextual data at the time the historical user searches were performed.

In some embodiments, a system or device other than the system is used to generate and/or train the machine-learning model. For example, such a system may include instructions for generating the machine-learning model, the training data and ground truth, and/or instructions for training the machine-learning model. A resulting trained-machine-learning model may then be provided to the system.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between contextual data and recommendation data, such that the trained machine-learning model is configured to determine an output score vector and/or vehicle search query in response to the input contextual data based on the learned associations.

In various embodiments, the variables of a machine-learning model may be interrelated in any suitable arrangement in order to generate the output. For example, in some embodiments, the machine-learning model may include image-processing architecture that is configured to identify, isolate, and/or extract features, geometry, and or structure in data associated with one or more vehicles, such as vehicle parameters. For example, the machine-learning model may include one or more convolutional neural network ("CNN") configured to identify features in the data, and may include further architecture, e.g., a connected layer, neural network, etc., configured to determine a relationship between the identified features in order to determine a location in the data.

Although depicted as separate components in FIG. 1A, it should be understood that a component or portion of a component in the environment 100 may, in some embodiments, be integrated with or incorporated into one or more other components. In some embodiments, operations or aspects of one or more of the components discussed above may be distributed amongst one or more other components. Any suitable arrangement and/or integration of the various systems and devices of the environment 100 may be used.

Further aspects of the machine-learning model and/or how it may be utilized to recognize one or more contextual indicators and provide one or more recommendations are discussed in further detail in the methods described below. In the following methods, various acts may be described as performed or executed by a component from FIG. 1A, such as the user device 105, components thereof or one or more other aspects as described herein. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

The user device 105 is designed to be an intuitive and user-friendly device that allows a user 140 to interact with various websites and systems. When a user 140 inputs information into the user device 105, such as a web address or search query, the user device 105 uses this information to navigate to the desired website.

The navigation process starts with the user 140 inputting the desired website address or search query into the user device 105. This information is processed by the device's operating system and web browser, which then send a request to the relevant server, such as a third-party server 120 or remote server 110, to retrieve the website's content.

The third-party server 120 or remote server 110 receives the request and retrieves the requested information from its associate data storage device (e.g., data storage system 117, 127). The third-party server 120 or remote server 110 may then send the information back to the user device 105, which processes the data and displays the website via the device's display 109.

The communication between the user device 105 and the third-party server 120 or remote server 110 may be facilitated by the Transmission Control Protocol/Internet Protocol (TCP/IP) and/or the Hypertext Transfer Protocol (HTTP). These protocols define the rules for transmitting data over the internet and ensure that the information is properly formatted and can be received and understood by the user device 105.

The user device 105 also may employ security measures, such as secure socket layer (SSL) or transport layer security (TLS) protocols, to encrypt the data being transmitted between the user device 105 and the third-party server 120 or remote server 110. This may provide an additional layer of security to protect sensitive information, such as login credentials and payment information, from unauthorized access.

As described herein, user device 105 can be any device with a web browser and internet connectivity, such as a desktop computer, laptop, smartphone, or tablet. The user inputs on a first website that indicate permission to receive electronic data can include clicking on a button or link, filling out and submitting a form, or making a selection from a dropdown menu. One or more types of permissions may be granted by the user, such as permission to access their location data, permission to send push notifications, or permission to access the device's camera or microphone. The types of electronic data that may be received by the user device include, but are not limited to, text, images, audio files, video files, and executable code. The user device's 105 web browser may utilize APIs (Application Programming Interfaces) to interact with the device's hardware and software components. For example, the browser may use the Geolocation API to access the user device's 105 GPS hardware and determine the user's location, or the Web Audio API to access the user device's 105 audio hardware and play an audio file. Additionally, the method may involve the use of cookies or other tracking technologies to store user preferences or track user behavior across multiple websites. The user device's 105 operating system may also play a role in facilitating these interactions and permissions, as it provides the underlying platform for the web browser and other software to run on.

Referring now to the widget 200, as depicted in FIG. 1B, the widget 200 may be implemented as part of the GUI displayed on the display 109 of the user device 105. The widget 200 may provide a convenient and efficient way for the user 140 to search for and interact with vehicle information, as well as perform various other tasks in the environment 100. The widget 200 may comprise a search field 202, one or more filters 204, and a display area for results 206.

The search field 202 may be an input text box that allows the user 140 to enter a query, such as keywords or phrases, to search for relevant vehicle information. The search field 202 may be configured to accept user input in various forms, including text, voice commands, or the like. When the user 140 submits a query through the search field 202, the user device 105 may communicate the query to the remote server 110 and/or the third-party server 120, which may process the query and retrieve relevant vehicle information from their respective data storage systems 117 and 127.

The one or more filters 204 may be selectable options or controls provided within the widget 200 that enable the user 140 to refine the search results based on specific criteria, such as vehicle make, model, year, price range, color, mileage, or the like. The filters 204 may be presented as checkboxes, drop-down menus, sliders, or other suitable user interface elements. The user 140 may select or adjust one or more filters 204 to narrow down the search results to better suit their preferences or requirements. The filters 204 may be dynamically updated based on the available vehicle information in the data storage systems 117 and 127, ensuring that the user 140 has the most relevant and up-to-date filtering options.

Upon receiving the search query and any selected filters 204, the remote server 110 and/or the third-party server 120 may process the query and filter criteria to generate a list of search results. These search results may be displayed in a results 206 area of the widget 200. The results 206 may be presented as a list, grid, or other suitable layout, and may include visual representations of the vehicles, such as images or icons, along with textual information, such as vehicle make, model, year, price, and other relevant details. The user 140 may interact with the results 206, for example, by selecting a specific vehicle to view more detailed information or perform additional actions, such as contacting a seller, requesting a test drive, or the like.

In some embodiments, the widget 200 may be designed to adapt its appearance and functionality based on the user's device 105 or display 109 characteristics, such as screen size, resolution, or the like. This may ensure improved user experience and usability across various devices and display configurations. Furthermore, the widget 200 may utilize machine-learning models, as described in paragraph [0037], to provide personalized search results, filter recommendations, or other features tailored to the user's preferences and behavior. In some embodiments, the widget 200 may be configured to display a map that shows vehicle locations relevant to the user 140. This map display feature may provide a visual representation of the geographic distribution of the search results, allowing the user 140 to quickly identify vehicles located in their vicinity or within a specific area of interest.

Figure 2:
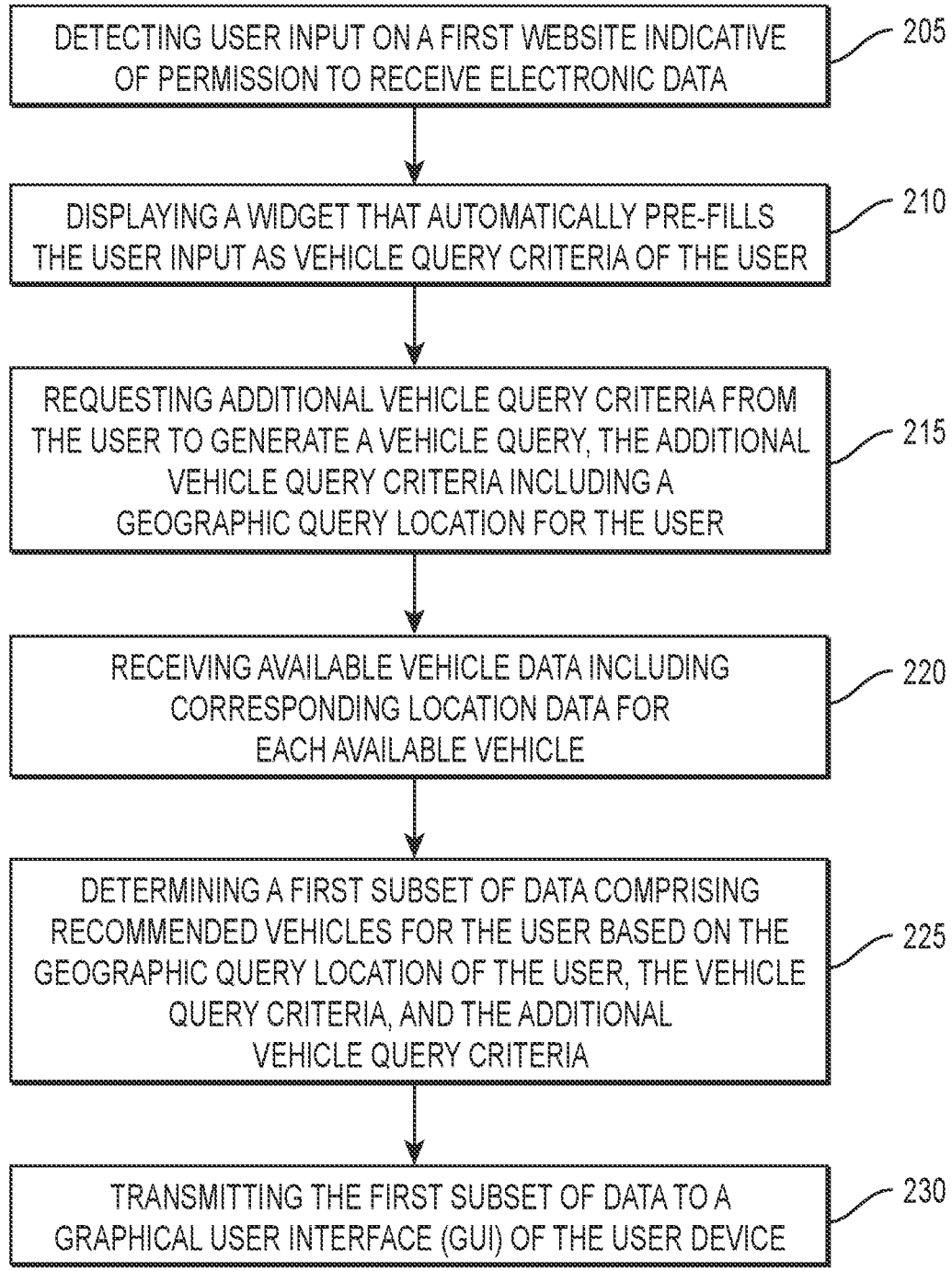
FIG. 2 depicts a flowchart of an exemplary method for transmitting electronic query data, according to one or more embodiments.

FIG. 2 illustrates an exemplary process for transmitting electronic query data. At step 205, the method may include detecting, via a user device of a user, user input on a first website, the user input indicative of permission to receive electronic data. The detection of user input may be done through the use of event listeners, which are a programming construct that allows the system to listen for specific events, such as a button click or a form submission, and respond to them. In some embodiments, the event listeners are associated with or otherwise integrated into the browser, while in some embodiments the event listeners are integrated into the widget. In some embodiments, the event listeners can "listen for" or otherwise detect and/or identify user input on the first website that indicates permission to receive electronic data. In some embodiments, the types of permissions that may be detected through this method may include explicit permission from the user 140, such as clicking on a "allow" button, as well as, in some embodiments, implicit permission, such as the user 140 actively engaging with a form or input field.

Once the user input is detected, it may be stored on one or more storage systems 107, 117, 127, or a storage device which is local to a user device 105, such as the browser's local storage, Cookies, or a database on the user's device. Storing the input allows the system to retain the user's preferences and settings across different sessions, so the user 140 does not have to re-enter them each time they visit the website. Moreover, the storage of the user input may remove one or more step to ask permission from the user 140 during each session.

The method may include receiving from a user one or more additional input, which may be provided without prompting. Such input may be related to a search query criteria, such as vehicle query criteria. The inputs may be detected by way of drop-down menus or checkboxes, as well as text input in fields like "make and model" and "year" of a vehicle, for example. The inputs may be detected by a widget (such as a browser extension, plug-in, or the like) associated with the user device 105, which may prompt the user 140 to input one or more vehicle parameters and/or search query criteria. A webpage may include one or more fields which receive said inputs, and the widget may identify such fields and capture inputs provided for by the user 140. The widget may be designed not only to record direct user inputs but also to monitor and track user engagement with various fields on the visited website. This enables the widget to automatically gather and register user inputs that are made on the website fields, thus eliminating one or more step for the user to manually replicate the same input into the widget interface itself. The user's interaction with the website fields becomes a source of input for the widget, which can then incorporate this data into its own system.

At step 210, the method may include displaying the widget that automatically pre-fills vehicle query criteria of the user based on one or more portions of the user input. The widget display may include retrieving one or more user inputs from the local storage device where it was previously stored, such as the browser's local storage, cookies, or a database of the user device 105. The method may include initializing the widget's HTML and Cascading Style Sheets (CSS) and/or other programming of the widget and thereby populating the widget with the retrieved user input. The method may include a positioning of the widget relative to one or more pieces of content displayed on a screen of the user (e.g., display 109 of user device 105), such that the widget is positioned on the display in a location that is easily visible to the user. The widget's display may be rendered as a box or a sidebar containing various form elements, such as drop-down menus, checkboxes, text fields, and the like, that correspond to the vehicle query criteria and one or more results. The widget may be formatted to be visually distinct from the rest of the page, to make it clear to the user that it is a separate element. The layout and design may be customizable as to comply with website layouts, user preferences, provider requirements, and the like.

At step 215, the method includes requesting, via the widget, additional vehicle query criteria, which may be requested from the user 140 and/or the user device 105, to generate a vehicle query, the additional vehicle query criteria including a geographic query location for the user 140. In some embodiments, the method includes initializing a new form element within the widget specifically for the geographic query location. This may be a text field for an address or zip code, or a map-based interface that allows the user 140 to select an area by clicking and dragging a box, or the like. The method may further include validating the location input to ensure that it is a valid address or location. The system may use a geolocation API to look up the address or coordinates and verify that they are within a valid range. Further, the system may verify the location with a GPS module associated with the user device 105, thereby performing the validation silently (e.g., without user 140 interaction or input). Alternatively or additionally, the request may be made silently, such that the user 140 is not prompted. With such silent requests, the system may request location data from the user device, and may check that location data against known location data of the user 140 based on a profile of the user 140. The method may further include storing the location as an additional vehicle query criteria and including it in the vehicle query when the user 140 initiates a new search.

In addition to the geographic location, the additional vehicle query criteria may include, but are not limited to, the make and model of the vehicle, the year of the vehicle, the price range of the vehicle, the color of the vehicle, and the geographic location of the user 140. These criteria may be requested via the widget, and used to generate a more specific vehicle query that can be used to search for vehicles that match the user's preferences.

To generate the more specific query, the widget may first establish a data connection to the remote server 110 and/or the third party server 120, which may be used to access and retrieve data from a database of vehicles. This connection could be established over a network such as electronic network 130 using standard protocols such as HTTP or HTTPS. Once connected, the widget could use web scraping techniques to retrieve relevant data from the remote server 110 and/or the third party server 120, such as make and model of the vehicle, year, price range and color. Once the widget has collected the relevant data, it may then filter and process this data to generate a specific query based on the criteria provided by the user. The query may then be sent back to the remote server 110 and/or the third party server 120, which could use it to search through the database of vehicles and return a list of vehicles that match the user's criteria. The result may be retrieved and displayed to the user via the widget.

In some embodiments, the method utilizes an external query, where the widget accesses data which is available outside of its own local storage at the beginning of the query, and in some embodiments does not access data utilizing an internal query. The external query may access data that is available via a web interface, and may work by using web scraping techniques to retrieve the data from a website or web page. The widget may be programmed to send an HTTP or HTTPS request to a specific URL associated with the website or web page, which may then return the requested data in the form of an HTML or XML document. Once the widget receives this document, it may use web scraping techniques to extract the data, such as make and model of the vehicle, year, price range and color. The widget may then use this data to generate a query based on the criteria provided by the user, and send the query back to the website or web page.

In some embodiments, the method utilizes an internal query, where the widget only accesses data which is available to its local storage and local databases at the beginning of the query. Such an internal query may work by using a data storage that is stored on the same device as the widget (e.g., by using data storage system 107 of user device 105). This data storage may be populated with the data before the query is executed. When the user 140 requests additional vehicle query criteria via the widget, the widget may use this data to search through the local data storage to find any vehicles that match the user's criteria. Advantageously, this may provide faster performance as the data does is not retrieved from an external source and it also allows offline access to the data. Additionally, having a local data storage may allow for more control over the data, security and privacy, avoiding external or unknown sources.

In some embodiments, the method includes a combined query, where the widget accesses data both from the web interface and from local storage. A combined query approach that uses both external and internal query features may work by utilizing the strengths of both approaches to provide a more comprehensive and efficient way to access data. The system may initially populate the widget's local storage and local data storage (e.g., data storage system 107 of user device 105) with a large set of vehicle data from an external source, such as a remote server or a web page. This data may be collected using web scraping techniques or through an API.

Once the local data storage has been populated, the widget may then use this data to quickly search for vehicles that match the user's criteria and display the results to the user 140. In parallel, the widget may use an external query to retrieve additional data from a remote server or web page in real-time, and append it to the local data storage. This would allow the widget to have access to the most up-to-date information, as well as offline access in case of lack of internet connection. Then, in response to a user request for additional vehicle query criteria via the widget, the widget may use a combination of both internal and external query methods to search for vehicles that match the user's criteria. For example, the widget may use the local data storage to search for vehicles that match the user's criteria quickly, and then use an external query to retrieve additional data from a remote server 110 and/or third party server 120, or a web page and append it to the search results, providing a more comprehensive set of results.

This combined approach may have some additional benefits related to validation and data management. The widget may use the data retrieved from the external source to compare, validate and update the data in the local data storage, removing duplicates, or ensuring consistency.

The method may include requesting, via the widget, additional vehicle query criteria from the user 140 to generate a vehicle query. If the user 140 does not provide any additional search criteria or the criteria provided by the user 140 is determined to be insufficient and/or incomplete, or the system otherwise identifies that a search may be better performed with one or more additional search criteria (such as based on an initial search query resulting in too many vehicles, or the like), the system may identify one or more contextual indicators (e.g., a geographic area, a brand of vehicle, a make of vehicle, used/new criteria, or other contextual indicator which appears within the web page that is associated with one or more parameters of a vehicle) which correspond to one or more vehicle data. Such identification may be performed through API or through contextual mapping of one or more elements of the web page. The identification may also be performed via machine-learning. Once the system generates one or more contextual indicators, the system may prompt the user to select one or more of the contextual indicators, which then may be used in the vehicle query. The user 140 may also input additional criteria manually, either through the widget or through some other input device.

At step 220 the method includes receiving available vehicle data including corresponding location data for each available vehicle. An available vehicle may be determined and/or classified based on one or more parameters of the vehicle. For example, a vehicle may be classified as an available vehicle if it simple exists within one or more database from one or more server which is accessed during the method. As another example, a vehicle may be classified as available when the vehicle both exists within one or more databased and it satisfies one or more other condition, such as being within a defined geographic location relative to a user and/or a device of the user. It will be appreciated that other combinations of criteria may selectively include and exclude one or more vehicles from being classified as available vehicles. The vehicle data may include just location, but also may include other data, such as contextual indicators. The contextual indicators may be generated from one or more aspects of the webpage, such as the URL, HTML elements, CSS elements, or the like. The method may involve training and/or utilizing a machine-learning model to identify contextual indicators based on information available to the widget. For example, one or more contextual indicators may be that the present webpage sells vehicles of a first brand. The widget may identify this context and subsequently apply one or more contextual criteria, such as to display vehicles that are associated with the first brand. The widget may also display one or more vehicles associated with a second brand, the second brand being correlated or otherwise associated with the first brand. Such correlation may be by way of sales correlations, such that the system provides a second brand that is likely to be purchased when a user is specifically demonstrating an interest in the first brand. In some embodiments, the method leverages a machine learning model, trained to discern contextual indicators from various webpage elements, that both broadens the scope of potential vehicle matches by correlating associated brands, and simultaneously refines the search results to a smaller size by identifying specific contextual identifiers, where desired.

Vehicle data, which may be available vehicle data, may be accessed from several different sources, and the access may be context dependent. A routine, subroutine, or step may be included that is designed to gather data from multiple sources, including both online and offline sources. The data acquisition step may include accessing data from the current webpage (e.g., the first website) or a database that has recently scraped and stored data related to the current webpage. The data acquisition step may also include accessing stored data from a variety of other sources. These sources may include data from previous website visits, data from previous user sessions, data that has been shared with the present device (e.g., a user device) from other users and/or other devices of the other users, either through a peer-to-peer network or a centralized server, and data from active background processes that are searching for additional information on websites in real-time.

At step 225, the method includes determining a first subset of data. The first subset of data may be based on and/or comprise recommended vehicles for the user based on one or more of the geographic query location of the user 140, the vehicle query criteria, and the additional vehicle query criteria. Other factors may be utilized to determine the first subset of data, such as the user's search history, demographic information, user's credit information, and the like.

The method may also include determining a second subset of data, which may comprise additional vehicle information and options, such as pricing, financing options, and any available promotions or discounts. The second subset of data may also include information relevant to the user 140, such as a user's credit score or credit approvals for certain vehicles. This subset of data may be based on the first subset of data and may be further refined based on the user's specific desires and preferences.

As discussed herein the vehicle query criteria of the present disclosure may include, but is not limited to: make, model, year, body style (e.g., sedan, coupe, SUV, truck, or the like), price range (e.g., total vehicle price, estimated monthly payment, etc.), mileage, color, engine (e.g., V6 or V8, hybrid, electric, or the like), transmission (e.g., automatic or manual), fuel type (gasoline, diesel, hybrid, electric, or the like), location (e.g., location of dealer/seller or distance from user), features (e.g., navigation, sunroof, heated seats, and the like), vehicle condition (e.g., new, used, certified pre-owned, and the like), number of doors (e.g., 2-door, 4-door, and the like), door opening arrangement (e.g., standard, scissor, butterfly, gull, etc.), drivetrain (front-wheel drive, rear-wheel drive, four-wheel drive, and the like) interior features (leather seats, heated seats, rearview camera, infotainment systems, and the like), owner history (e.g., number of previous owners or a specific owner history (such as one-owner or fleet vehicle)), service history (e.g., regularly serviced, accident-free, and the like), safety features (e.g., airbags, anti-lock brakes, stability control, lane departure warning, and the like), towing capacity, performance specs (e.g., horsepower, torque, 0-60 time, top speed, and the like), trim level, fuel efficiency, price negotiation (e.g., vehicles that are open to price negotiation or those with a fixed price), or VIN number.

At step 230, the method includes transmitting the first subset of data to a graphical user interface (GUI) of the user device 105. The method may include implementing the GUI via the widget. The widget may provide a comprehensive and user-friendly interface for interacting with the system and is configured to receive one or more input and provide one or more output to the user. The GUI may be configured to display all the gathered data together, allowing the user to easily review and compare the recommended vehicles and their associated information. It may also be configured to separate and/or demarcate one or more data sets from one or more other data sets, such as separating the present web results from stored/external data sources, allowing the user to clearly understand the source of the information. The GUI may also be provided to include a variety of filters that the user can apply to the data, such as make, model, year, price range, and the like. This allows the user to quickly and easily narrow down their search results to find the vehicle that best meets their desires. In addition to the filters, the GUI may be configured to provide the ability to easily update the search query. This allows the user to quickly and easily modify their search criteria and re-run the search without having to navigate through multiple menus or input screens.

The widget may, in some embodiments, include one or more features or configurations which are accessible by the user. The widget may include a search bar where users can enter a query and customize the display of the first data set. The search bar would be prominently displayed at the top of the widget, making it easy for users to find and use. The display of the results of the first data set may be sortable, such as by alphabetical, date, or by a relevance score, or the like. The widget may include one or more personalization features, such as saved searches, alerts for one or more searches or saved searches, a history, a user profile and preference, custom recommendations, or the like.

The widget may also include a map view. The widget may utilize one or more of a library or API to create and display an interactive map, either within the GUI of the widget, in a new tab in a browser of a user 140, or both. When a user 140 conducts a vehicle search, the widget sends an HTTP request to one or more of the remote server 110 and/or the third party server 120 with the search parameters. The server then queries a database for the relevant vehicles and their locations, and sends the results back to the widget in the form of a JSON object.

The widget then parses the received data and uses one or more programming library, such as a JavaScript library, to display the location of the vehicles on the map as markers. The markers can be clicked on to show more information about the vehicles. When the user clicks on the option to open the map in a new tab, the widget constructs a URL that encodes the search parameters and the current map view and opens it in a new browser tab. This URL may be shared and accessed directly by others (e.g., via a copy/paste action), allowing them to see the exact same map view.

The method may, in some embodiments, include conducting an additional search. The additional search may be based on one or more additional or different vehicle query criteria. For example, a first search may be based on a first brand, while a second search may be based on a second brand. The widget may compare the results of the first and the second search to generate a resulting dataset, the resulting dataset being a combined dataset displaying all results of both searches or the resulting dataset may be a dataset which shows results (vehicles) which appear in the results of both searches.

The widget may include functionality for updating search results. The widget may receive one or more updated vehicle data, such as renewed search result or re-running of a saved search. Further, the widget may perform the updating functionality as a background process (e.g., without visibility to the user), updating any search result in real-time as the user utilizes the widget or based on any periodic frequency (e.g., daily, weekly, etc.). The method may include receiving updated data, either from the third party server 120 or from web-scraping techniques utilized on the user's current browser page. The method may utilize existing user inputs or search criteria and/or saved searches, or may utilize pre-set criteria running in a background process, or both. The widget may run a relevant query and receive updated data for the search query. The widget then may determine, based at least in part on the stored user input, that the updated data includes updated recommended vehicles. The process of running this query may be automated, such that it runs periodically, or it may be instituted by the action of a user, such as by clicking a button to update results. Moreover, the widget may operate buy updating the results in the background but not displaying the updated results to the user, instead prompting the user by asking if the user wishes to see the updated results.

The widget may then notify the user of, or otherwise display, the updated vehicles to the user. This may be done through the GUI by integrating the updated data set within the existing (or first) data set, such that the updated vehicles are seamlessly added to the existing list of vehicles, keeping the list current and up-to-date. The widget may specifically identify the updated vehicles, such as by showing the updated vehicles in a pop up on the screen of a device of the user, showing a switch where a user may toggle old and updated results, sending a notification, such as an email or push notification, which may provide a link (such as to a map), or the like.

The method may also include determining a credit worthiness for a user and updating the results of the search accordingly. The method may involve tracking a user, such as by assigning them a session ID, which may be unique to the user, when they first access the widget. This session ID may be stored on the user's browser as a cookie and may be sent with every subsequent request to the remote server 110. The session ID may be associated with a user profile on a remote system, such as a remote server 110, which may include or otherwise be configured to determine a credit worthiness of one or more user based, at least in part, on the profile. The profile may be pre-existing, or it may be created when the user first is assigned an ID. The user ID may later be linked to an existing profile. The user may further provide to the system information relevant to credit worthiness, such as wage information or the like.

In some embodiments, when a user conducts a vehicle search, the widget sends a request to the remote server 110 along with the search parameters and the user's session ID. The remote server 110 and/or the widget then queries to check the user's credit information (e.g., credit score, pre-qualification status, buying power). The remote server 110 may have a database of the users, which may have the user's credit information. The remote server 110 may look up the user's credit information and either return it directly to the widget or process it further before sending a response to the widget. The remote server 110 and/or widget may then use the credit information to filter the search results, which establishes a data set, such as a second data set or a credit dataset. The credit dataset may include the vehicles for which the user's credit information (e.g., credit score, pre-qualification status, busying power) is appropriate (e.g., sufficient). The filtered results are then sent back to the widget, or, in some embodiments, the credit worthiness rating is sent back to the widget, at which points the widget itself filters the results and subsequently displays them to the user. The credit check process may be implemented through a secure connection to protect the user's credit information. Additionally, the information shared with the remote server 110 may be encrypted to prevent malicious actors from intercepting it. The credit worthiness check may be implemented against a first data set containing a plurality of vehicles, or it may be run against a single vehicle, which may be instituted by the user by clicking a button.

In some embodiments, a user may be pre-qualified for purchasing one or more vehicles. In some embodiments, the user may be pre-qualified based on the user's credit worthiness and then displaying an option to purchase a specific recommended vehicle through the graphical user interface (GUI) of the user device 105. The user may be presented with one or more vehicle options to choose from, which prompts the user through the GUI display to select a vehicle, and which can be tailored to the user's preferences based on factors such as make, model, budget, driving habits, and the like. The user may then request pre-qualification for one of the provided vehicles by selecting it from the list, at which point the system may perform one or more action to verify and/or check user credit information. The algorithm may takes into account the user's credit score and financial history to determine the user's credit information and worthiness for one or more vehicle, such as the vehicle selected by the user. If the user is deemed credit-worthy, the algorithm then causes the GUI to display the option to advance in a purchasing workflow for the vehicle, where the option to advance may include relevant details such as the make, model, price, and financing options.

In some embodiments, the GUI The graphical user interface (GUI), as incorporated in widget 200 and displayable on display 109, may constitute a component in the system environment 100. The GUI may serve as an interface between the user 140 and the overall system, presenting interactive elements and feedback visually to the user 140.

The GUI may be presented within widget 200, which itself may be displayed on display 109 of user device 105. The widget 200, encompassing the GUI, may be programmed to be compatible with a variety of operating systems, screen sizes, and resolutions, thereby ensuring improved performance and user experience. The GUI's design may be configured to provide an intuitive user interface, assisting user 140 in easily navigating the system and efficiently accessing the functions.

In some embodiments, GUI may be structured into several components, including, but not limited to, a search field 202 and one or more filters 204. The search field 202 may serve as an interactive area wherein user 140 may input query criteria directly. The one or more filters 204, on the other hand, may be used by the user 140 to narrow down the results derived from the search field 202. These results may include available vehicles, their corresponding location data, or the like.

Moreover, the GUI, within the purview of widget 200, may be configured to automatically adapt to the input provided by the user 140, thus ensuring real-time response and dynamic interactivity. This may include the display of recommended vehicles based on vehicle query criteria, geographic location, or the like, as provided by the user 140. The GUI may also visually represent the first subset of data or recommended vehicles on a map, thereby providing a spatial context to the user 140.

The GUI may also provide overlays on an existing website, thereby enabling the user 140 to view the information while still interacting with the primary content of the website. This may serve to keep the user 140 within the same user experience environment, thus preventing disruptions while transitioning between different tasks or information sets.

In certain scenarios, the GUI may be designed to display a series of prompts, guiding the user 140 through various steps, such as defining additional vehicle query criteria, determining a geographic query location, or the like. These prompts may be presented in a clear, concise manner, easing the process of data input and decision making for the user 140.

In some embodiments, the GUI may also be configured to display interactive elements that allow for user feedback or requests. This could include, for instance, an option for the user 140 to qualify for purchasing a specific recommended vehicle. In response to such user interactions, the GUI may dynamically change, providing relevant responses or options based on the user's 140 input or choices.

Widget 200, as displayed on display 109 through the GUI, may be designed to contextually determine vehicle data associated with a first website. This function may leverage a variety of algorithms and analytical techniques, enabling widget 200 to intelligently identify and interpret the content of the first website. The identified content may encompass textual, image-based, or other types of data that are indicative of vehicle-specific information.

Upon encountering vehicle data on the first website, widget 200 may decompose this data into various components, each possibly corresponding to a distinct vehicle query criterion. These criteria may encompass aspects such as the make, model, year, price, among other characteristics of a vehicle. Widget 200 may use predefined templates or criteria to recognize specific patterns or structures within the data, signifying particular types of information, or widget 200 may utilizing a machine-learning model to perform the determination.

In some embodiments, upon user 140 initiating interaction with widget 200, the user may manually input one or more criteria via GUI of widget 200, such as through search field 202. The criteria may include, but are not limited to, vehicle make, model, year, price range, fuel type, mileage, color, or the like. This manual input may provide a primary set of vehicle query criteria, which may help to guide widget 200 in contextually determining additional vehicle data as user 140 navigates further websites.

As user 140 continues to browse other websites subsequent to their initial interaction with widget 200, widget 200 may continue to perform its contextual determination function. It may scan and analyze the content of these additional websites to detect further vehicle data. These websites may include vehicle listing sites, vehicle review sites, automotive forums, social media platforms, or the like.

The additional vehicle data determined by widget 200 from the subsequent websites may be processed to form supplemental vehicle query criteria. This supplemental criteria may be used in combination with the primary set of criteria input by the user 140 to refine the selection of potentially interesting vehicles. For instance, if the user 140 initially input a preference for a certain vehicle make and model, and widget 200 subsequently determines from a car review website that vehicles of that make and model from certain production years have particularly high ratings, widget 200 may add these production years to the vehicle query criteria.

The determination of vehicle data from subsequent websites may employ similar methods to those used for the first website, such as predefined templates or machine-learning models. For instance, widget 200 may be configured to recognize patterns, structures, or specific keywords within website content that indicate certain types of vehicle-related information. Widget 200 may also utilize machine-learning models trained to understand the context of the website content and to accurately identify vehicle data even when presented in diverse formats or styles.

Having successfully parsed and identified the vehicle data, widget 200 may then proceed to automatically populate one or more search fields 202 within the GUI based on the contextually determined data. The pre-population of the search field 202 need not be limited to a single criterion but may involve multiple criteria derived from the detected vehicle data. Various search fields 202 may correspond to different aspects of the vehicle query criteria, enabling user 140 to review, amend, or add to the pre-filled data. Furthermore, the contextual determination of vehicle data by widget 200 may involve an inference process. Here, widget 200 may deduce certain data points based on the observed data from the first website. For instance, the mention of a specific vehicle model might lead widget 200 to infer the make of the vehicle, or vice versa. This inferred data may also be used to pre-fill the appropriate search field 202.

Once widget 200 performs a contextual determination of vehicle data on a first website, it may proceed to identify a set of vehicles that may be of interest to the user 140. This identification process may involve matching the contextually determined vehicle query criteria against a database of available vehicle data, stored perhaps in one or more data storage systems 107 or 117.

This matching process may involve a comparison of individual characteristics or a composite score reflecting overall similarity. For instance, widget 200 may identify vehicles whose make, model, year, and other characteristics closely align with the vehicle query criteria obtained from the first website. Alternatively, widget 200 may employ a scoring system to evaluate the overall alignment of each available vehicle with the determined criteria, selecting those vehicles with the highest scores.

Upon identifying a set of vehicles that may be of interest to the user 140, widget 200 may proceed to display these vehicles to the user. The display of these vehicles may take place either directly through the GUI or via an overlay on the existing webpage. In the latter case, widget 200 may create an overlay that is superimposed on the content of the existing webpage, presenting the selected vehicles without requiring the user to navigate away from the original content.

This overlay may include various details about each vehicle, such as its make, model, year, price, or other relevant information. In some embodiments, the overlay may also incorporate interactive elements, such as buttons or links, that allow the user 140 to obtain more information about a vehicle, initiate a purchase or reservation, or perform other actions related to the displayed vehicles.

In some embodiments, this overlay generated by widget 200 may be considered an extension or a component of the GUI. That is, despite its distinctive nature as an overlay, it may share many of the design characteristics, interactivity features, and other aspects that define the GUI. It may be seamlessly integrated into the GUI, providing a coherent and intuitive user experience In some embodiments, for additional refinement, the machine-learning model could be further trained on a dataset comprising example search data from potential vehicle purchasers. This data may include search parameters such as make, model, year, color, mileage, and price range, as well as more subjective variables like aesthetic appeal, vehicle performance, and brand reputation. By cross-analyzing these diverse types of data, the model can establish multi-dimensional associations and infer potential relationships between various search criteria. once widget 200, through the GUI, has identified a set of vehicles that may be of interest to the user 140 based on the contextual determination, it may proceed to display these vehicles in a geographically relevant manner. This geographical display may enhance the user experience by allowing the user to visualize the location of the vehicles relative to a chosen or detected geographic location, thus providing additional context and information that may influence the user's decision-making process.

Widget 200 may incorporate a map display function, presenting the identified vehicles on a geographical map. Each vehicle may be represented as a marker or a pin on the map, with the position of each marker reflecting the geographical location associated with the corresponding vehicle. The location data for each vehicle may be extracted from the available vehicle data, possibly stored in one or more data storage systems 107 or 117.

The geographical map displayed by widget 200 may center on a geographic query location associated with the user 140. This geographic query location may be determined in several ways. For instance, the user may manually input a desired location or range into search field 202. Alternatively, widget 200 may utilize GPS data from user device 105 to automatically determine the user's current location.

The geographical map may be displayed through the GUI in a new browser window or within the GUI itself. If displayed in a new window, the map may occupy the full area of the window, enabling the user 140 to manipulate the map independently of the original webpage.

Alternatively, if the map is displayed within the GUI of widget 200, it may appear as a dedicated section or panel within the interface. This embedded map may interact seamlessly with the other elements of the GUI, contributing to an integrated and intuitive user experience. The user may interact with the map, zoom in or out, re-center the view, or perform other actions to explore the geographically relevant results.

The method may further utilize one or more machine-learning models to provide the improved search query transmission described herein. The method may utilize one or more machine-learning models to analyze trends of vehicle contextual data associated with a search or a data set and historical query criteria, in order to predict and improve future results. The method may gather data on webpage data such as meta tags, HTML code, CSS, or other contextual indicators associated with classifying one or more aspects of a vehicle, such as make, model, brand, year, or the like, the webpage title, the webpage content, and/or the user interactions with the webpage. This data may be preprocessed and cleaned to prepare it for use in the machine-learning model.

Once the data is ready, the system trains a machine-learning model, such as a decision tree, random forest, or neural network, to identify patterns or relationships between the webpage data and the historical query criteria. The trained model will output a scoring vector for one or more contextual indicators and a value associated with that contextual indicator that represents the likelihood of the vehicle matching the criteria based on the webpage data. In some embodiments, the machine-learning model can aggregate and predict search criteria from multiple websites visited by a user, either during the current session or across multiple sessions. This provides a holistic view of the user's search patterns across various platforms and sessions, thereby enhancing the precision of predictions. Moreover, the model doesn't merely analyze static webpage data; it also leverages dynamic user interaction data from these websites. Interactions such as page views, click patterns, and navigation behaviors can provide context to the model about user preferences and interests.

To make its predictions more contextually accurate, the machine-learning model is also equipped to weight these interactions based on one or more factors. For instance, time spent on a specific webpage can be an influential determinant. Further, for each query criteria, a threshold may be applicable to each score in the scoring vector and a threshold may be associated with each of one or more search criteria for each output of the scoring vector. For example, a 'brand' criteria may have a threshold, which a score must surpass in order for the criteria to be applied. The scoring vector may then be used by the widget to develop a data set including one or more vehicles which satisfy the vehicle criteria and one or more associated threshold conditions. The vehicles which are a match for the criteria may be included in the data set. The widget may then present the ranked vehicles to the user, allowing them to quickly and easily find the vehicles that are most likely to match their criteria.

Additionally, the widget may use the scoring vector to automatically generate a query or prompt the user to select one or more of the contextual criteria to be used in the query, which can be used to search through local or external databases for vehicles that match the criteria. The results can be displayed to the user, who can then further refine the search if needed.

It should be understood that embodiments in this disclosure are exemplary only, and that other embodiments may include various combinations of features from other embodiments, as well as additional or fewer features. For example, while some of the embodiments above pertain to vehicle searchers, any suitable activity may be used. In an exemplary embodiment, instead of or in addition to vehicle searches, the method may be directed towards general product searches, or any other type of search.

In general, any process or operation discussed in this disclosure that is understood to be computer-implementable, such as the processes illustrated in FIG. 2, may be performed by one or more processors of a computer system, such any of the systems or devices in the environment 100 of FIG. 1A, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1A. One or more processors of a computer system may be included in a single computing device or distributed among a plurality of computing devices. A memory of the computer system may include the respective memory of each computing device of the plurality of computing devices.

Figure 3:
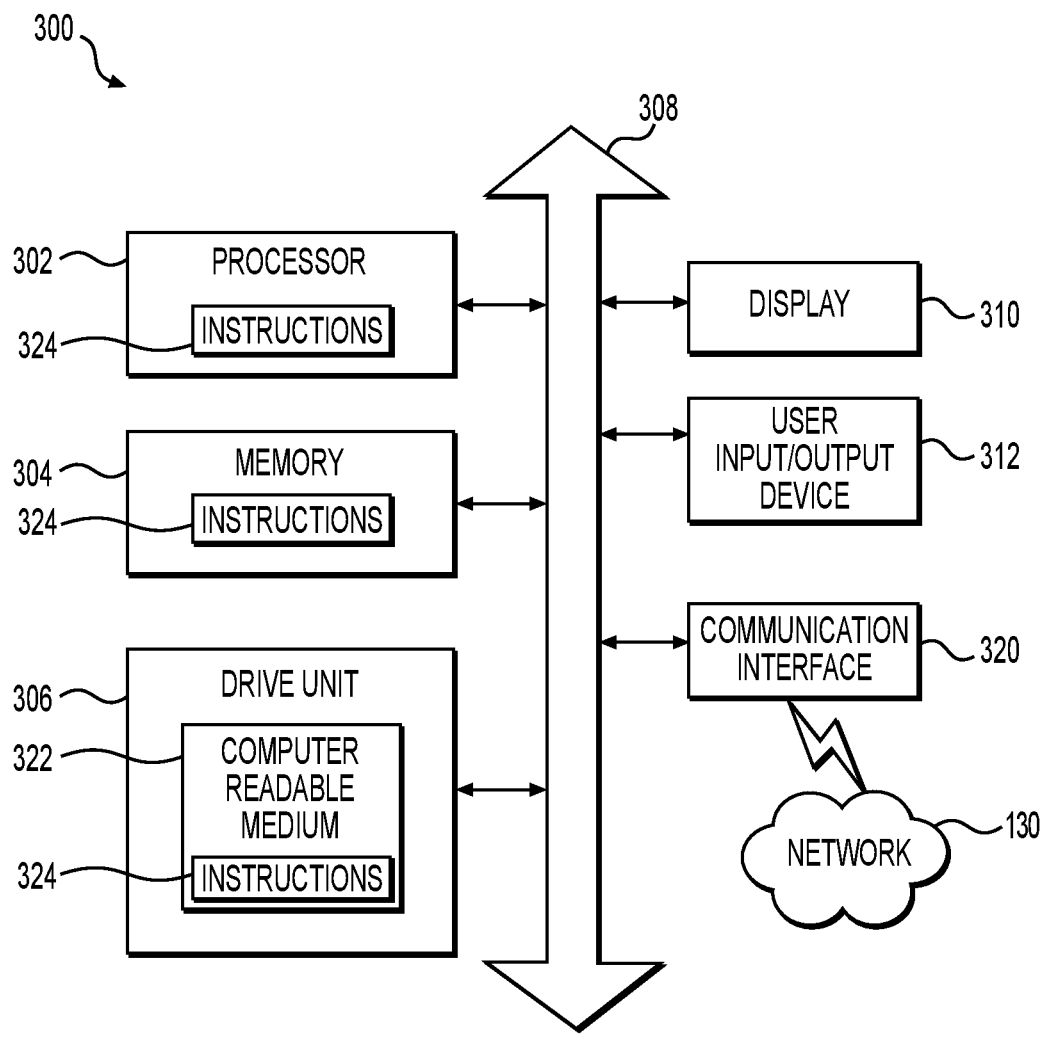
FIG. 3 depicts system structure, according to one or more embodiments.

FIG. 3 is a simplified functional block diagram of a computer 300 that may be configured as a device for executing the methods of FIG. 2, according to exemplary embodiments of the present disclosure. For example, the computer 300 may be configured as a query system and/or another system according to exemplary embodiments of this disclosure. In various embodiments, any of the systems herein may be a computer 300 including, for example, a data communication interface 320 for packet data communication. The computer 300 also may include a central processing unit ("CPU") 302, in the form of one or more processors, for executing program instructions. The computer 300 may include an internal communication bus 308, and a storage unit 306 (such as ROM, HDD, SDD, etc.) that may store data on a computer readable medium 322, although the computer 300 may receive programming and data via network communications. The computer 300 may also have a memory 304 (such as RAM) storing instructions 324 for executing techniques presented herein, although the instructions 324 may be stored temporarily or permanently within other modules of computer 300 (e.g., processor 302 and/or computer readable medium 322). The computer 300 also may include input and output ports 312 and/or a display 310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for transmitting electronic query data, the method comprising:
   detecting vehicle data on a first website;

causing a widget to automatically determine one or more vehicle query criteria based on at least a part of the detected vehicle data;

causing, via the widget, a graphical user interface (GUI) associated with the widget to display a prompt for a user to provide additional vehicle query criteria, receiving, via the GUI, the additional vehicle query criteria from the user, the additional vehicle query criteria including a geographic query location for the user;

iteratively determining until a pre-determined composite score for a second subset of data is met or exceeded:
  a first subset of data comprising recommended vehicles for the user based on the geographic query location of the user, the vehicle query criteria, and the additional vehicle query criteria, wherein the first subset is determined by comparing one or both of the one or more vehicle query criteria or the additional vehicle query criteria from the user to a database of available vehicle data; and
  the second subset of data based on the first subset of data, at least one user preference, and at least one of a user credit score or a user pre-approval, wherein the second subset is determined by comparing the first subset of data to user data;

transmitting the second subset of data to the GUI associated with the widget; and causing the widget to display at least a portion of the second subset of data on the GUI, the GUI being an overlay to an existing website.

2. The computer-implemented method of claim 1, wherein the display of the at least a portion of the second subset of data includes a representation of the determined recommended vehicles as corresponding locations on a map.

3. The computer-implemented method of claim 1, wherein the geographic query location comprises a geographic range preference.

4. The computer-implemented method of claim 1, wherein the geographic query location is automatically determined using GPS to detect the geographic location of a user device.

5. The computer-implemented method of claim 1, further comprising updating the displayed second subset of data on the GUI based on changes to the detected vehicle data or the additional vehicle query criteria.

6. The computer-implemented method of claim 1, further comprising:
  obtaining historical vehicle query criteria associated with the user associated with at least one historical vehicle query of the user, wherein the determining of the first subset of data is further based on the obtained historical vehicle query criteria.

7. The computer-implemented method of claim 1, further comprising:
  storing the vehicle query criteria on a local storage device;
  receiving updated available vehicle data;
  determining, based on the stored vehicle query criteria, that the updated available vehicle data includes updated recommended vehicles; and
  causing the widget to display, via the GUI, an updated second subset of data based on the updated available vehicle data.

8. The computer-implemented method of claim 1, further comprising:
  accessing a user profile of the user to determine a user credit worthiness score for the user; and
  determining the second subset of data by filtering from the first subset of data recommended vehicles for which the user credit worthiness score of the user is below a certain threshold.

9. The computer-implemented method of claim 8, further comprising:
  causing the widget to display to the user, via the GUI, an option to qualify for purchasing a specific recommended vehicle;
  receiving, via the GUI, an indication of a selection of the option by the user; and
  in response to receiving the indication and based on the user profile, determining whether the user qualifies for purchasing the specific vehicle.

10. The computer-implemented method of claim 1, wherein determining the first subset of data is performed using a machine-learning model, the machine-learning model trained to associate vehicle purchases and query criteria.

11. A computer-implemented method for transmitting electronic query data, the method comprising:
  detecting, on a user device of a user, user input on a first website indicative of permission to receive electronic data;
  causing, via a widget, a graphical user interface (GUI) associated with the widget to display a prompt for a user to provide additional vehicle query criteria,
  receiving, via the GUI, the additional vehicle query criteria from the user, the additional vehicle query criteria including a geographic query location for the user;
  receiving available vehicle data including corresponding location data for each available vehicle included in the available vehicle data;
  iteratively determining until a pre-determined composite score for a second subset of data is met or exceeded:
    a first subset of data comprising recommended vehicles for the user based on the geographic query location of the user, the vehicle query criteria, and the additional vehicle query criteria, wherein the first subset is determined by comparing the additional vehicle query criteria from the user to a database of available vehicle data; and
    the second subset of data based on the first subset of data, at least one user preference, and at least one of a user credit score or a user pre-approval, wherein the second subset is determined by comparing the first subset of data to user data; and
  modifying the GUI of the user device to display the second subset of data comprising recommended vehicles on a map at corresponding locations.

12. The computer-implemented method of claim 11, wherein the geographic query location comprises a geographic range preference.

13. The computer-implemented method of claim 11, wherein the geographic query location is automatically determined using GPS to detect the geographic location of the user device.

14. The computer-implemented method of claim 11, wherein the user input is stored on a local storage device.

15. The computer-implemented method of claim 14, further comprising:
  obtaining historical vehicle query criteria associated with the user associated with at least one historical vehicle query of the user, wherein the determining of the first subset of data is further based on the obtained historical vehicle query criteria.

16. The computer-implemented method of claim 15, further comprising:
receiving updated available vehicle data;
determining, based on the stored user input, that the recommended vehicles includes updated recommended vehicles; and
causing the widget to display, via the GUI, an updated second subset of data based on the updated recommended vehicles.

17. The computer-implemented method of claim 11, further comprising:
accessing a user profile of the user to determine a user credit worthiness score for the user; and
determining the second subset of data by filtering from the first subset of data recommended vehicles for which the user credit worthiness score of the user is below a certain threshold.

18. The computer-implemented method of claim 17, further comprising:
causing the widget to display to the user, via the GUI, an option to qualify for purchasing a specific recommended vehicle;
receiving an indication, via the GUI, a selection of the option by the user; and
in response to receiving the indication and based on the user profile, determining whether the user qualifies for purchasing the specific vehicle.

19. The computer-implemented method of claim 11, wherein determining the first subset of data is performed using a machine-learning model, the machine-learning model trained based on identifying trends of historical vehicle purchases and historical query criteria.

20. A computer-implemented method for providing contextually relevant recommendations, the method comprising:
detecting vehicle data present on a first website;
causing a widget to automatically determine one or more first vehicle query criteria based on the detected vehicle data;
receiving, via a graphical user interface (GUI) associated with the widget, additional vehicle query criteria from the user;
combining the first vehicle query criteria with the additional vehicle query criteria to generate a combined vehicle query criteria;
iteratively determining until a pre-determined composite score for a second subset of data is met or exceeded, with reference to a database of available vehicle data, a subset of recommended vehicles based on the combined vehicle query criteria, wherein the subset of recommended vehicles is determined by (i) comparing one or both of the one or more vehicle query criteria or the additional vehicle query criteria from the user to a database of available vehicle data and (ii) comparing the first subset of data to user data; and
displaying the subset of recommended vehicles, wherein display of the subset of recommended vehicles includes a representation of the subset of recommended vehicles as corresponding locations on a map.

* * * * *